United States Patent

Bond et al.

Patent Number: 6,072,845
Date of Patent: Jun. 6, 2000

[54] SIMPLIFIED INTERFERENCE SUPPRESSOR

[75] Inventors: James W. Bond, San Diego; Stefen Hui, Spring Valley, both of Calif.; William Y. Velez, Tucson, Ariz.

[73] Assignee: The United States of America as represented by the Secretary of the Navy, Washington, D.C.

[21] Appl. No.: 08/843,499

[22] Filed: Apr. 16, 1997

[51] Int. Cl.[7] .................................................. H04B 1/10
[52] U.S. Cl. .................................... 375/350; 375/285
[58] Field of Search ..................................... 375/227, 200, 375/206, 285, 346, 348, 350

[56] References Cited

U.S. PATENT DOCUMENTS

| | | |
|---|---|---|
| 3,706,933 | 12/1972 | Bidell et al. . |
| 4,271,525 | 6/1981 | Watanabe . |
| 4,320,523 | 3/1982 | Horikawa et al. ....................... 375/350 |
| 4,571,732 | 2/1986 | Pirani et al. . |
| 5,027,123 | 6/1991 | Haykin et al. . |
| 5,208,832 | 5/1993 | Greiss . |
| 5,495,496 | 2/1996 | Bond et al. ............................... 375/200 |
| 5,495,497 | 2/1996 | Bond et al. ............................... 375/200 |
| 5,511,068 | 4/1996 | Sato ......................................... 370/335 |
| 5,537,443 | 7/1996 | Yoshino et al. .......................... 375/340 |
| 5,646,964 | 7/1997 | Ushirokawa et al. ................... 375/346 |

*Primary Examiner*—Stephen Chin
*Assistant Examiner*—Lenny Jiang
*Attorney, Agent, or Firm*—Harvey Fendelman; Michael A. Kagan; Peter A. Lipovsky

[57] ABSTRACT

A simplified interference suppressor extends the applicability of adaptive locally optimum techniques to high speed communication systems. Traditional adaptive locally optimum processing amplitude quantity techniques compel baseband sample amplitudes calculation requiring square root operations that could limit the use of these techniques. The simplified interference suppressor utilizes amplitude squared values of baseband samples while maintaining the performance of those processing algorithms requiring the complexities of baseband sample amplitude calculation.

14 Claims, 5 Drawing Sheets

RECIEVER WITH POWER FILTER

RECEIVER WITH LOCALLY OPTIMUM AMPLITUDE PROCESSOR

RECIEVER WITH POWER FILTER

POWER CALCULATOR

POWER FILTERING

COMBINER

SIMPLIFIED INTERFERENCE SUPPRESSOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention is related to an interference suppression system that permits a signal-of-interest to be discerned from interference. More particularly, the invention allows a direct sequence bandspread communication signal to be perceived in the presence of masking interference having slowly varying power.

In the past, the adaptive locally optimum processing amplitude quantity techniques designed to reveal a signal-of-interest in the presence of stronger masking interference required the calculation of baseband sample amplitudes of a received signal. These adaptive locally optimum amplitude processing algorithms thereby presented the need to perform square root operations which can impose difficulties for some high speed digital components. A need thus exists for interference processing that avoids the need to perform square root processing and hence does not require the calculation of received signal sample amplitudes.

SUMMARY OF THE INVENTION

The simplified interference suppressor of the invention addresses the problems described above and may provide further related advantages.

The interference suppressor of the invention utilizes a receiver designed to receive a direct sequence bandspread signal. The receiver samples the received signal containing a signal-of-interest and interference and converts the samples into complex in-phase and quadrature components. A power calculator within the invention is used to sum the squared values of the in-phase and quadrature components to generate the amplitudes squared of the baseband samples. No square root operations need to be performed in the power calculator and the power calculator does not require the use or determination of the amplitudes of signal samples. A power filter is used to perform filtering on the amplitudes squared. A combiner is then used to combine the amplitudes squared, filtered amplitudes squared and the in-phase and quadrature components to produce an output signal having an interference to signal-of-interest power ratio that is less than the interference to signal-of-interest power ratio of the received signal. As in the power calculator of the invention, in the combiner no square root operations need to be performed and the combiner does not require the use or determination of the amplitudes of signal samples. The output signal from the combiner is then inserted into a demodulator for demodulation.

Other objects, advantages and new features of the invention will become apparent from the following detailed description of the invention when considered in conjunction with the accompanying drawings.

DESCRIPTION OF THE PREFERRED EMBODIMENT OF THE INVENTION

Figure 1:
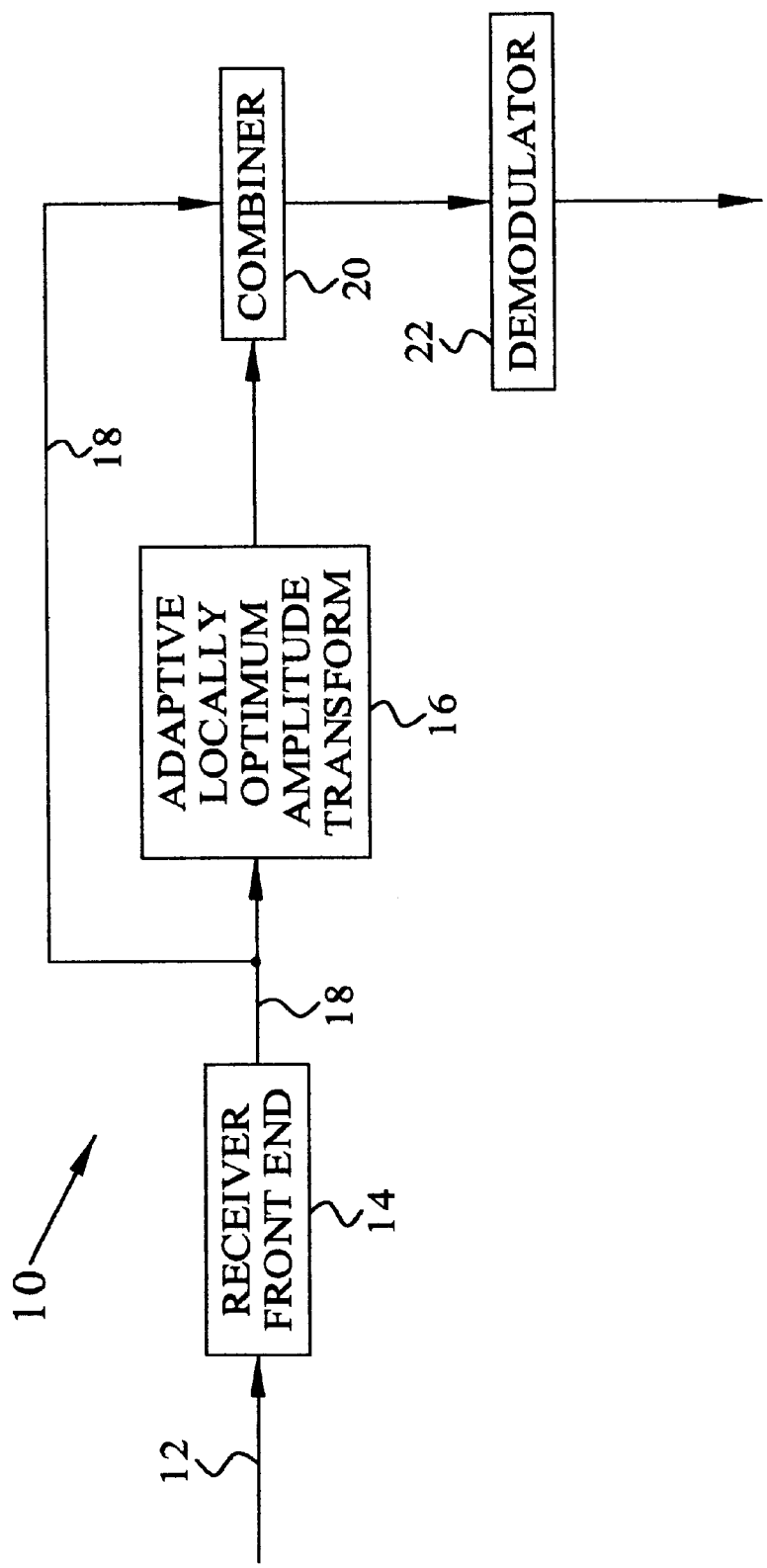
FIG. 1 shows the structure of a traditional receiver as employed with a traditional adaptive locally optimum amplitude processor and combiner.

FIG. 1 depicts generally an interference system 10 employing traditional adaptive locally optimum amplitude processing techniques in which the amplitudes of received signal baseband samples are calculated. In FIG. 1, a direct sequence bandspread signal 12 is received by a traditional receiver 14. Processor 16 performs an adaptive locally optimum amplitude transform on received signals 18 and the received and transformed signals are then combined in a combiner 20. The combined output is then demodulated using a despreading sequence available within a demodulator 22 such as found within a traditional receiver.

Such a traditional adaptive locally optimum amplitude processing technique requires that square root operations be performed to determine baseband signal samples amplitude values. The amplitude values are ultimately used in minimizing the effect of interfering signals. While this traditional form of interference suppression has proven useful for a variety of applications, it is known that for some applications the required square root procedure can be an obstacle for certain high speed digital components.

Figure 2:
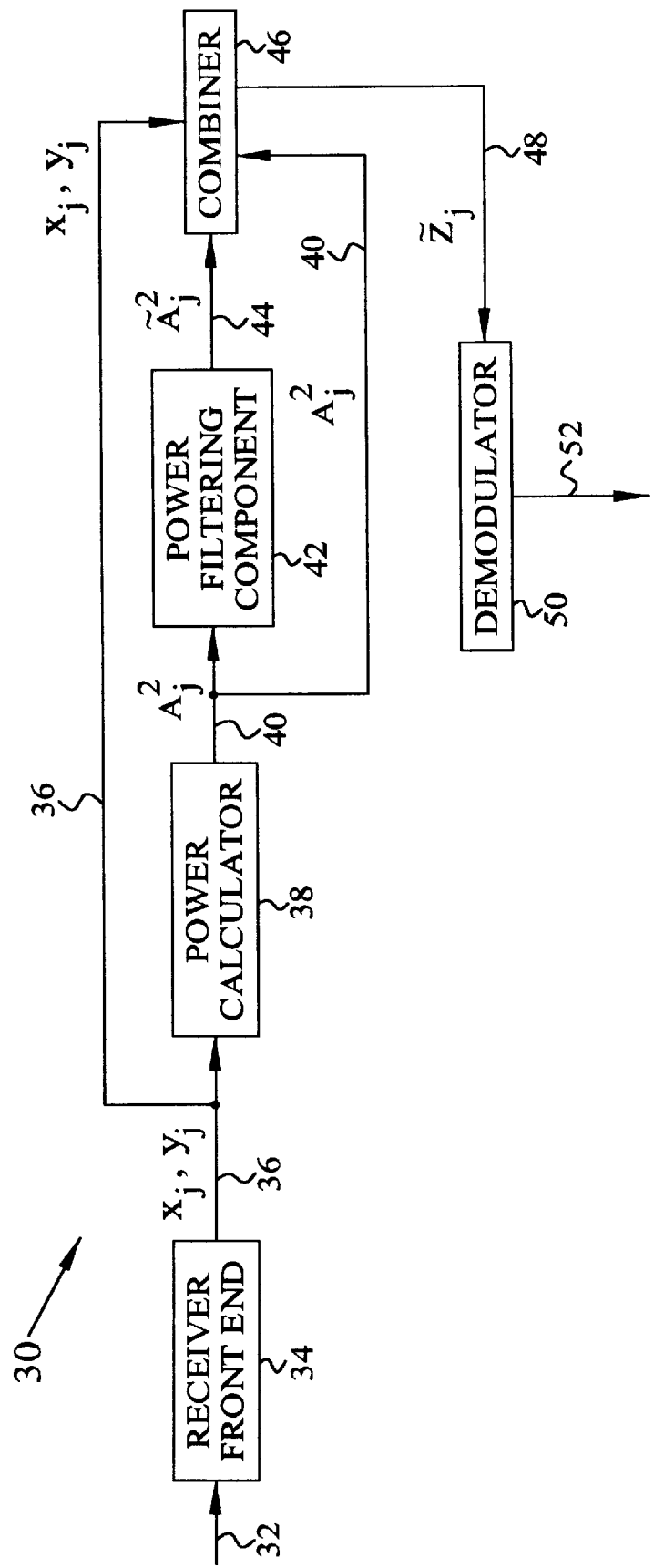
FIG. 2 depicts a representative embodiment of the invention in which the power calculator, power filter, and combiner of the invention are shown utilized with a traditional receiver front-end and demodulator.

In FIG. 2 a simplified interference suppressor system 30 is shown according to a representative embodiment of the invention. A transmitted signal 32, containing both a signal-of-interest component and an interference component, is received in a front-end 34 of a traditional receiver. The transmitted signal is of an interference to signal-of-interest power ratio described herein as the received interference to signal-of-interest power ratio. The receiver front-end samples the received signals and converts the samples into a complex series of signal samples 36 each having in-phase $x_j$ and quadrature $y_j$ components.

Complex signal samples 36 are then processed in power calculator 38, to be further described, that generates signal amplitude square values 40 from the in-phase and quadrature components contained within complex signal samples 36. No square root operation is performed in the power calculator and the power calculator does not use or determine the amplitudes of the complex signal samples.

A power filter 42, to be further described, is then used to form filtered amplitude square values 44 a sum which is proportional to $$\tilde{A}_j^2 = \frac{1}{2N} \sum_{k=-N}^{N} (A_j^2 - A_{j+k}^2)$$

for a positive, preferably even integer N, preferably 8.

A combiner 46, to be further described, is then used to form an output signal 48 having a signal-of-interest component and an interference component. Output signal 48 has a lower interference to signal-of-interest power ratio than the interference to signal-of-interest power ratio of the signal as originally received.

Combiner 46 combines bleed-through in-phase and quadrature components 36, signal amplitude square values 40, and filtered signal amplitude square values 44 in the form of the output $$Z_j^\sim = \mu\left[\left(\frac{x_j}{A_j^2}, \frac{y_j}{A_j^2}\right)\tilde{A}_j^2\right] + a\left(\frac{x_j}{A_j^2}, \frac{y_j}{A_j^2}\right)\tilde{A}_j^2,$$

where $\mu$ is a normalization constant produced as a by-product of the combiner processing and "a" is an attenuation factor to be discussed.

Combiner output signal 48 is then demodulated using a despreading sequence available within a demodulator 50 such as that found within a traditional receiver. Demodulated signal 52 is then available to a listener.

Figure 3:
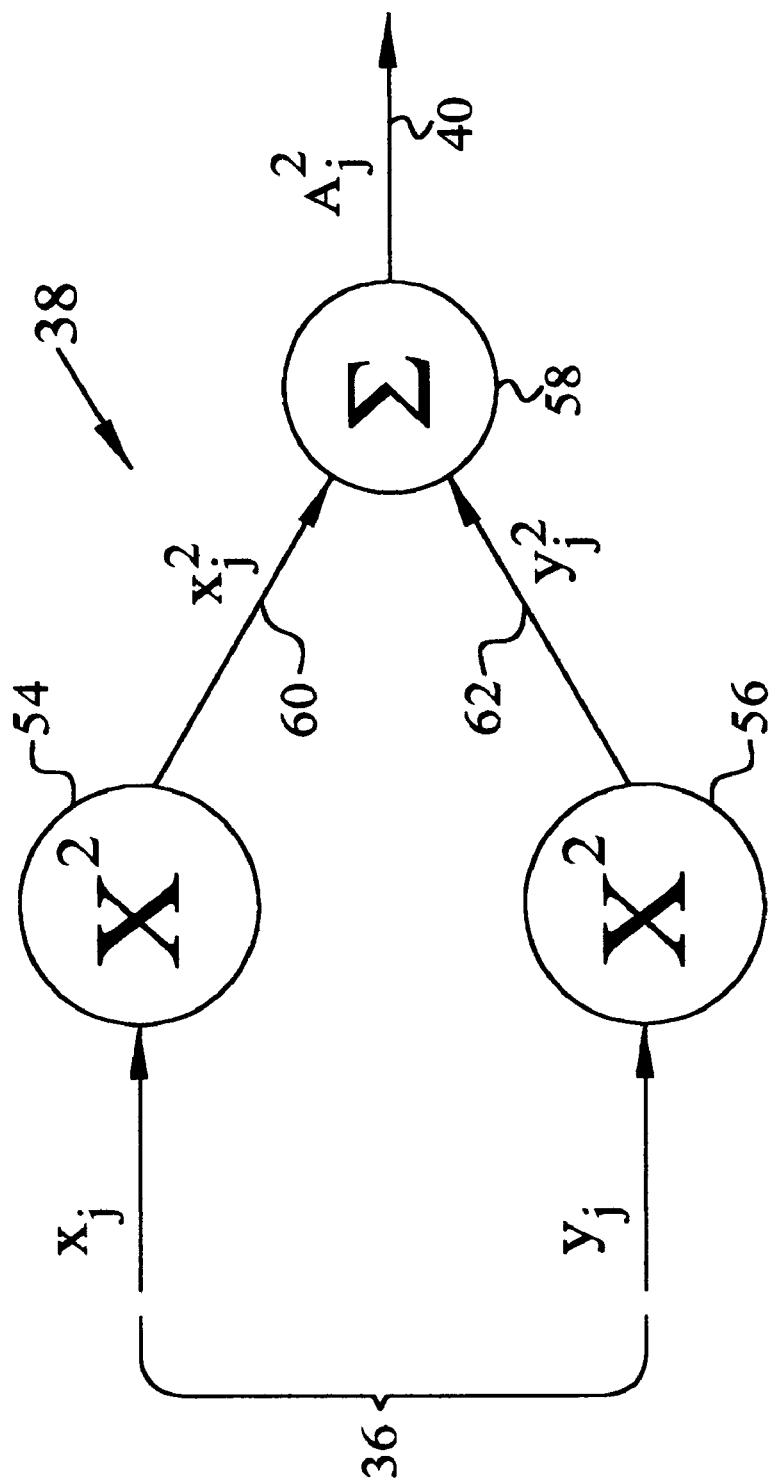
FIG. 3 depicts a power calculator as may be used in the embodiment of the invention illustrated in FIG. 2.

By way of example, power calculator 38 may be implemented as shown in FIG. 3. Squaring functions 54 and 56 form the squares of complex signal 36 components $x_j$ and $y_j$, respectively. Summing function 58 adds squared outputs 60 and 62 from squaring functions 54 and 56 and outputs summed amplitude squared output 40.

Figure 4:
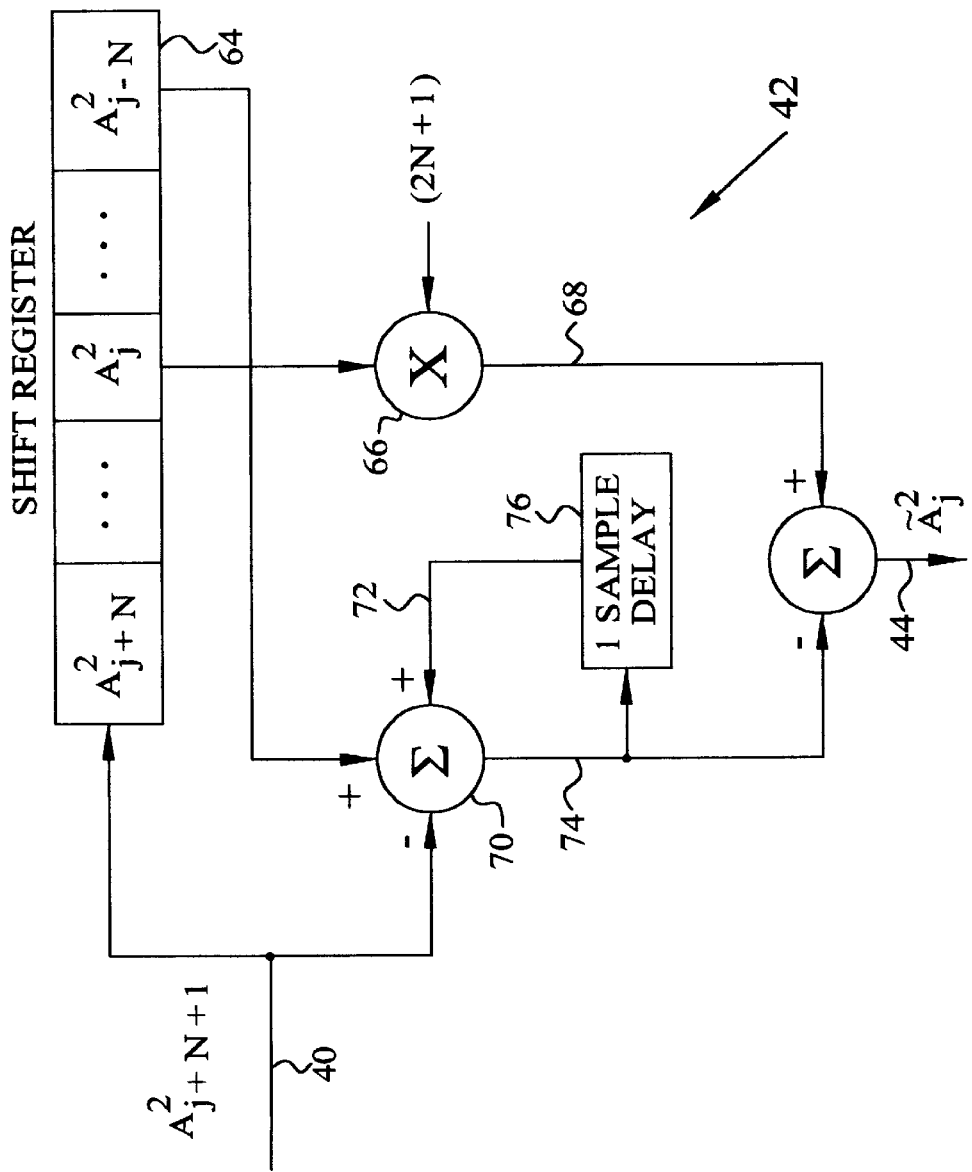
FIG. 4 is a block diagram of a power filter as may be used in the embodiment of the invention illustrated in FIG. 2.

By way of example, power filter 42 of FIG. 2 may be implemented as shown in FIG. 4 to generate an amplitude squared transform series, that is a fixed multiple of $\tilde{A}^2_j$, recursively from amplitude squared series $A^2_j$. By recursively calculating $\tilde{A}^2_j 2$, substantial time can be saved over parallel calculating techniques.

In power filter 42, a shift register 64 shifts amplitude squared series $A^2_j$ across (2N+1) stages, where N is a positive, preferably even integer, preferably 8 and (2N+1) corresponds to a sample length having (2N+1) amplitude squared samples. A multiplier 66 multiplies amplitude squared samples from a middle stage of shift register 64 by (2N+1) to form a middle product 68. A summing function 70 sums samples from an end stage of shift register 64 with a delayed sample series 72 and subtracts amplitude series $A^2_j$ to form a shift sum series 74. Unit sample delay 76 is used to delay shift sum series 74 to form delayed sum series 72. An output summing function 78 subtracts shift sum series 74 from middle product 68 to form amplitude squared series $\tilde{A}^2_j$.

Figure 5:
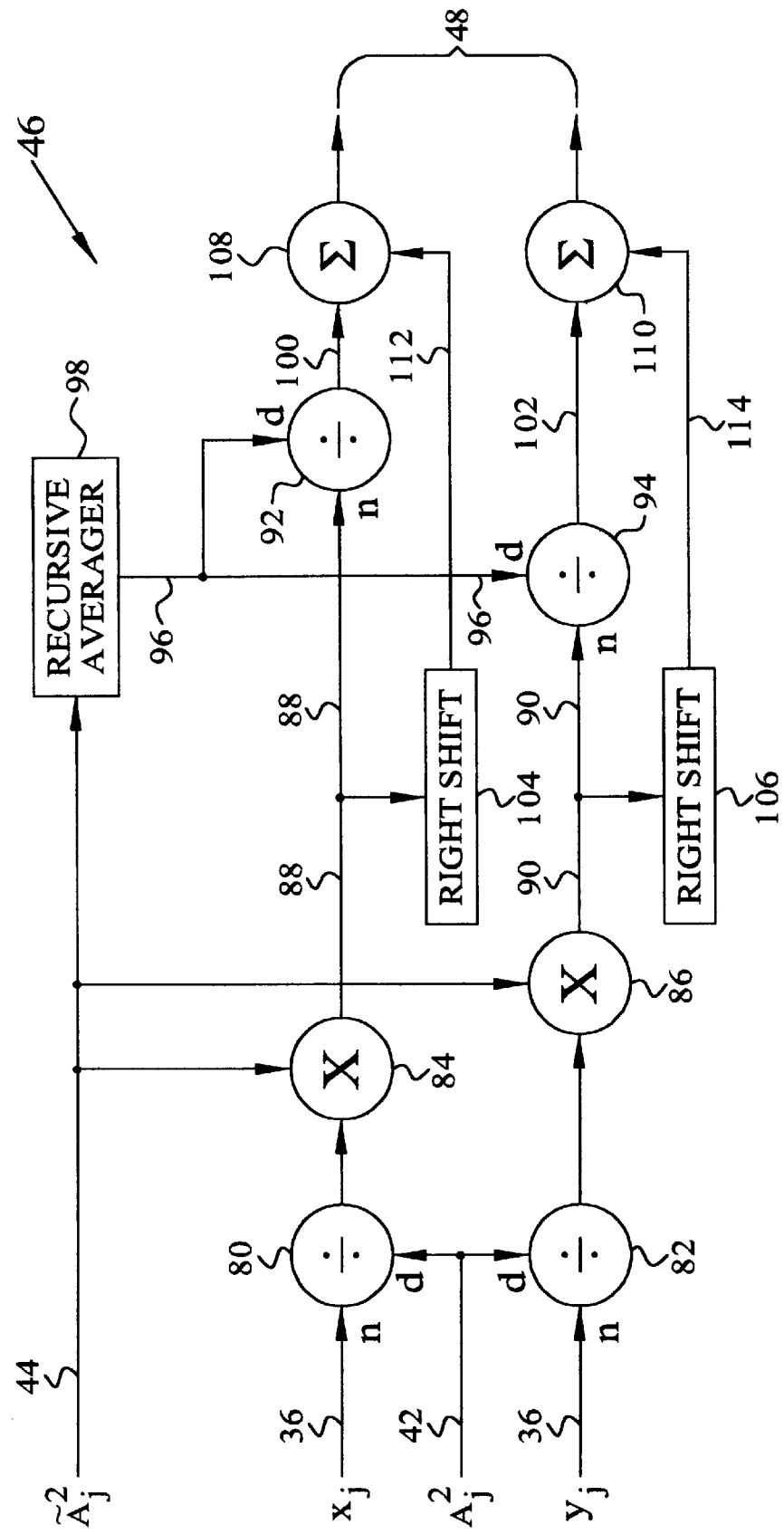
FIG. 5 is a block diagram of a combiner as may be used in the embodiment of the invention illustrated in FIG. 2.

By way of example, combiner 46 of FIG. 2 may be implemented as shown in FIG. 5 to generate combined output signal $$Z_j^\sim = \mu\left[\left(\frac{x_j}{A_j^2}, \frac{y_j}{A_j^2}\right)\tilde{A}_j^2\right] + a\left(\frac{x_j}{A_j^2}, \frac{y_j}{A_j^2}\right)\tilde{A}_j^2,$$

where $\mu$ is a normalization constant that emerges as a by-product of the combiner processing and "a" is an attenuation factor to be described below. Dividers 80 and 82 divide in-phase $x_j$ and quadrature $y_j$ complex signal components, respectively, by amplitude squared sum $A^2_j$ to form quotients $x_j/A^2_j$ and $y_j/A^2_j$. Combiner multipliers 84 and 86 multiply quotients $x_j/A^2_j$ and $y_j/A^2_j$ by $\tilde{A}^2_j$, respectively, to form in-phase product 88 and quadrature product 90.

Normalization of in-phase product 88 and quadrature product 90 is achieved by use of dividers 92 and 94, respectively, that divide these products by recursively averaged filtered amplitude squared sum $\tilde{A}^2_j$ 96 as determined by recursive averager 98. The normalization factor used to produce normalized products 100 and 102 is the inverse of recursive averager output 96. In phase product 88 and quadrature product 90 are suitably attenuated in right shifters 104 and 106, respectively. Preferably, the right shifters are single bit (providing a ½ attenuation factor) to reduce the product terms by 3 dB. These products can of course be otherwise attenuated such as by a factor of ¼ (6 dB) by using shifters of two bits. Normalized product summing functions 108 and 110 add normalized in-phase product 100 and normalized quadrature product 102 with attenuated in phase product 112 and attenuated quadrature product 114, respectively, to form combined output $$Z_j^\sim = \mu\left[\left(\frac{x_j}{A_j^2}, \frac{y_j}{A_j^2}\right)\tilde{A}_j^2\right] + \frac{1}{2}\left(\frac{x_j}{A_j^2}, \frac{y_j}{A_j^2}\right)\tilde{A}_j^2,$$

where $\mu$ is the normalization constant and the "½" factor represents the referred degree of right shifter provided attenuation.

In the combining operation of the invention, no square root operations need to be performed and the combiner does not require the use of or a determination of the amplitudes of signal samples. Combined output $z_j^\sim$ is then inserted into radio demodulator 22 of FIG. 2 to be demodulated using a despreading sequence such as that used within a traditional receiver. By way of the processing of the invention, combined output $z_j^\sim$ has an output interference to signal-of-interest power ratio that is less than the interference to signal-of-interest power ratio of signals as originally received by the invention.

The invention extends the applicability of adaptive locally optimum techniques to high speed communication systems for which taking square roots could limit the use of these techniques. Prior to this invention, adaptive locally optimum processing amplitude quantity techniques required the calculation of baseband sample amplitudes which is avoided by this invention while maintaining the performance of these algorithms.

Obviously, many modifications and variations of the invention are possible in light of the above teachings. It is therefore to be understood that within the scope of the appended claims the invention may be practiced otherwise than as has been specifically described.

What is claimed is:

1. A method comprising:
    receiving a signal containing a signal-of-interest component and an interference component and having a received interference to signal-of-interest power ratio; and
    processing said signal to form from said signal an output signal containing an output signal-of-interest component and an output interference component and having an output interference to signal-of-interest power ratio that is less than said received interference to signal-of-interest power ratio, and in which said processing does not include determining amplitude values of said signal.

2. The method of claim 1 in which the step of receiving said signal comprises generating a complex signal from said signal.

3. The method of claim 2 wherein the step of generating a complex signal from said signal comprises
    sampling said signal to get signal samples; and
    converting said signal samples into complex signal samples.

4. The method of claim 3 wherein the step of processing said signal to form said output signal comprises
    generating signal amplitude squared values from said complex signal samples;

filtering said signal amplitude squared values to form filtered signal amplitude squared values; and combining said complex signal samples, said signal amplitude squared values, and said filtered signal amplitude squared values to form said output signal.

5. The method of claim 4 wherein a sum of said filtered signal amplitude squared values is found substantially by the formula $$\tilde{A}_j^2 = \frac{1}{2N} \sum_{k=-N}^{N} (A_j^2 - A_{j+k}^2)$$

wherein N=an integer, j=a sample index, k=a sample index, $\tilde{A}^2_j$=said sum of filtered amplitude squared values of index j $A_j^2$=amplitude squared values of index j, and $A_{j+k}^2$= amplitude squared values of index j+k.

6. The method of claim 5 wherein said output signal is found substantially by the formula $$Z_j^\sim = \mu\left[\left(\frac{x_j}{A_j^2}, \frac{y_j}{A_j^2}\right)\tilde{A}_j^2\right] + a\left(\frac{x_j}{A_j^2}, \frac{y_j}{A_j^2}\right)\tilde{A}_j^2$$

wherein $\mu$=a normalization constant, $\alpha$=an attenuation factor, j=said sample index, $z_j^\sim$=said output signal of index j, $x_j$=in-phase signal sample component of index j, $y_j$=quadrature signal sample component of index j, $A_j^2$=said amplitude squared values of index j, $\tilde{A}^2_j$=said sum of filtered amplitude squared values of index j.

7. The method according to claim 1 in which said signal is a direct sequence bandspread signal.

8. The method according to claim 7 further including a step of demodulating said output signal.

9. A method comprising the steps of:
receiving a signal containing a signal-of-interest component and interference component, in which said signal has a received interference to signal-of-interest power ratio;
sampling said signal to get signal samples;
converting said signal samples into in-phase and quadrature components;
generating signal amplitude squared values from said in-phase and quadrature components;
filtering said signal amplitude squared values to form filtered signal amplitude squared values; and
combining said in-phase and quadrature components, said signal amplitude square values, and said filtered signal amplitude square values to form an output signal containing an output signal-of-interest component and an output interference component, in which said output signal has an output interference to signal-of-interest power ratio that is less than said received interference to signal-of-interest power ratio, and in which said steps do not include determining signal amplitude values of said signal samples.

10. The method according to claim 9 in which said signal is a direct sequence bandspread signal, further including a step of inserting said output signal into a demodulator.

11. An apparatus in which a receiver is used for receiving a signal containing a signal-of-interest component and an interference component and in which said signal has a received interference to signal-of-interest power ratio, and in which said receiver converts said signal into a complex signal, the apparatus comprising:
a calculator for generating signal amplitude squared values from said complex signal;
a filter for forming filtered signal amplitude squared values from said signal amplitude squared values; and
a combiner for combining said complex signal, said signal amplitude squared values, and said filtered signal amplitude squared values to form an output signal having an output signal-of-interest component and an output interference component, in which said output signal has an interference to signal-of-interest power ratio that is less than said received interference to signal-of-interest power ratio, and in which said receiver, calculator, filter and combiner are not used to determine signal amplitude values of said signal.

12. The apparatus according to claim 11 in which said signal is a direct sequence bandspread signal.

13. The apparatus according to claim 11 in which said complex signal has in-phase and quadrature components and in which said calculator generates said signal amplitude squared values from said in-phase and quadrature components.

14. The apparatus according to claim 13 in which said signal is a direct sequence bandspread signal.

* * * * *